United States Patent [19]

Wilcox, deceased

[11] 3,918,334

[45] *Nov. 11, 1975

[54] METHOD FOR GUIDANCE OF SAW BLADES UTILIZING BERNOULLI EFFECT

[75] Inventor: William H. Wilcox, deceased, late of Stockton, Calif., by Elizabeth Wilcox, executrix

[73] Assignee: Sun Studs, Inc., Roseburg, Oreg.

[ * ] Notice: The portion of the term of this patent subsequent to Nov. 26, 1991, has been disclaimed.

[22] Filed: June 26, 1974

[21] Appl. No.: 483,216

Related U.S. Application Data

[63] Continuation of Ser. No. 333,980, Feb. 20, 1973, Pat. No. 3,850,060.

[52] U.S. Cl. .................. 83/13; 83/169; 83/820; 83/821
[51] Int. Cl.² ............. B23D 47/00; B23D 55/08; B27B 5/29; B27B 13/10
[58] Field of Search ............. 83/820, 821, 169, 13; 308/5, 3

[56] References Cited
UNITED STATES PATENTS

| | | | |
|---|---|---|---|
| 3,225,801 | 12/1965 | Dunn et al. | 83/820 |
| 3,593,763 | 7/1971 | Neild | 83/821 |
| 3,623,520 | 11/1971 | Neild | 83/820 X |
| 3,674,065 | 7/1972 | Fairfield et al. | 83/169 |
| 3,850,060 | 11/1974 | Wilcox | 83/13 |

*Primary Examiner*—Donald R. Schran
*Attorney, Agent, or Firm*—Chernoff & Vilhauer

[57] ABSTRACT

A method and apparatus for guiding rapidly moving power saw blades to insure accuracy of cut and minimize blade deflection and vibration. A pair of saw guides having flat, parallel faces are mounted in opposed relationship to one another with a saw blade sandwiched between them, the space between the two guides being sufficient to provide respective predetermined gaps between the blade and the face of each guide. Near the center of each guide face is a port through which a pressurized fluid, which is preferably a finely atomized oil-air mixture, is introduced into the respective gaps, such fluid flowing radially outwardly from the port through the gap toward the periphery of the respective guide face. The predetermined size of each gap is such that, for the particular pressure and flow of fluid involved, regions of subatmospheric pressure pursuant to the Bernoulli effect are created on either side of the saw blade in the respective gaps, the suction tending to increase if a respective gap widens and decrease if the gap narrows due to blade deflection. During operation the blade normally remains in a central position of equilibrium between the two guides with the respective suction pressures on each side of the blade balancing one another. Momentary deflection of the blade increases the suction on one side and decreases it on the other, thereby providing a rapidly acting restoring force to return the blade to its central position.

4 Claims, 3 Drawing Figures

METHOD FOR GUIDANCE OF SAW BLADES UTILIZING BERNOULLI EFFECT

This application is a continuation of my copending application Ser. No. 333,980, filed Feb. 20, 1973, now U.S. Pat. No. 3,850,060.

BACKGROUND OF THE INVENTION

This invention relates to improvements in method and apparatus for guiding high speed power saw blades such as those of the rotary or band type. More particularly the invention is directed to the guidance of such saw blades by the creation of subatmospheric pressures at the respective sides of the blade to prevent undue deflection or vibration and maintain the blade in proper cutting position during operation.

In fluid bearing saw guides of the type known to the art and shown for example in Dunn et al. U.S. Pat. No. 3,225,801, Wright U.S. Pat. No. 3,557,848, Fairfield, Jr. U.S. Pat. No. 3,674,065 and McLauchlan et al. U.S. Pat. No. 3,479,097, pressurized fluid is directed against each side of the saw blade to create a superatmospheric fluid cushion exerting a positive force against the blade. The opposed positive pressures hold the blade equidistant from bearing shoes positioned on either side of the blade, thereby preventing bodily contact between the shoes and the blade. The pressurized fluid utilized may wholly or partially comprise a liquid for lubricating the blade. Some improved systems, such as that disclosed in the Fairfield, Jr. patent, employ bearing shoes having a recessed cavity portion to enhance the positive force distribution exerted against the sides of the saw blade.

While fluid bearing saw guides of the aforementioned positive pressure type do succeed in reducing frictional heating of the blades by eliminating mechanical contact between the blades and guides, they suffer from certain significant disadvantages. One of these is the fact that, although such systems exert a high positive absolute force against both sides of the blade, there is not a particularly high rate of change in that force caused by small incremental deflections of the blade. It is however this change in force, referred to herein as the "restoring force", which pushes the blade back to equilibrium after deflection and thus determines the dynamic stiffness of the blade. Accordingly the capability of present positive pressure type fluid bearing systems for accurately maintaining proper blade position by resisting small deflections of the blade has been seriously limited by the relatively low rate of restoring force generated in response to such deflections.

In addition, fluid bearing guides of the positive pressure type require a recessed cavity of substantial area formed in the face of each bearing shoe, as exemplified by the aforementioned Fairfield, Jr. patent, to provide satisfactory pressure distribution over the surface of the blade. However such recessed construction, in order to generate optimum restoring force, requires a relatively wide gap between the bearing shoes and saw blade which in turn requires a relatively high volumetric flow of fluid to maintain the necessary pressure on the blade. Consequently a proportionately large power source for supplying the pressurized fluid would be needed. Furthermore, if the fluid employed is wholly or partially comprised of water as suggested in several of the foregoing patents, and if the sawed product is wood, large volumetric flows will tend to cause excessive wetting of the sawdust thereby requiring a costly drying step before the sawdust can be disposed of. The use of large liquid volumes also tends to increase the load imposed on local waste water treatment facilities.

Accordingly a need presently exists for an improved saw guide of the fluid bearing type capable of imparting a greater restoring force, and thus greater dynamic stiffness, to the saw blade while employing a relatively lesser volume of fluid than is the case with positive pressure type saw guides presently known to the art.

SUMMARY OF THE PRESENT INVENTION

The present invention is directed to a fluid bearing saw guide method and apparatus wherein a subatmospheric pressure, rather than a superatmospheric pressure, is exerted on the sides of the moving saw blade to provide dynamic stiffness. A pressurized fluid, preferably air mixed with a liquid lubricant, is fed into a respective gap on each said of the saw blade formed by a pair of opposed saw guides having flat faces mounted parallel with the blade. The respective gaps between the guide faces and the saw blade are initially set at a suitable predetermined size to insure that a suction is imposed on each side of the blade by the velocity of fluid flow through the gap parallel with the blade, pursuant to the Bernoulli effect. At equilibrium the respective subatmospheric pressures and therefore forces are equal, and the blade assumes a central position between the guides. Momentary deflections of the blade caused by outside forces widen one gap and thereby increase its suction while narrowing the opposite gap and decreasing its suction, thus providing a pressure imbalance and consequent restoring force. The guides are preferably mounted so as to permit them to tilt slightly to maintain parallelism with the faces of tapered blades and with the faces of blades which have deflected from their correct cutting path.

In contradistinction to positive pressure type saw guides which exert superatmospheric pressure on the blade, the restoring force caused by the Bernoulli effect is maximized by the utilization of flat saw guide surfaces. This is because suction, i.e. subatmospheric pressure, is created at the points of highest fluid velocity in the gap between the saw blade and the guide faces. A flat guide face parallel with the saw blade produces a uniform gap and therefore a uniformly high fluid velocity thoughout substantially the entire area between the guide and the saw blade, thereby maximizing the area over which the suction is imposed. A recessed guide on the other hand creates highest fluid velocities only at its perimeter, encompassing a much smaller area to which the suction can apply.

Utilization of a flat-faced saw guide operating in the Bernoulli (subatmospheric) region provides several important advantages. Although the maximum absolute force exerted on either side of the saw blade in the Bernoulli region may not be as high as that obtainable from positive pressure systems, the rate of restoring force caused by small deflections of the blade from equilibrium is substantially greater, other factors such as fluid supply pressure and saw guide area being equal. This critical improvement in the rate of restoring force, caused by imposing suction rather than positive pressure on the saw blade, provides a marked increase in dynamic stiffness and accurate positioning of blades guided by fluid bearing techniques. In addition, it has been determined that flat-faced saw guides can operate with maximum restoring force in the Bernoulli region generally at a narrower gap size than a recessed guide can optimally operate in the positive pressure region, other factors being equal. For any given fluid supply pressure this reduction in gap size means that the volumetric flow will generally be less, requiring less power and causing less wetting of the product if a liquid lubricant is used.

The foregoing and other objectives, features and advantages of the present invention will be more readily understood upon consideration of the following detailed description of the invention taken in conjunction with the accompanying drawings.

DETAILED DESCRIPTION OF THE DRAWINGS

DESCRIPTION OF THE PREFERRED EMBODIMENT

Figure 1:
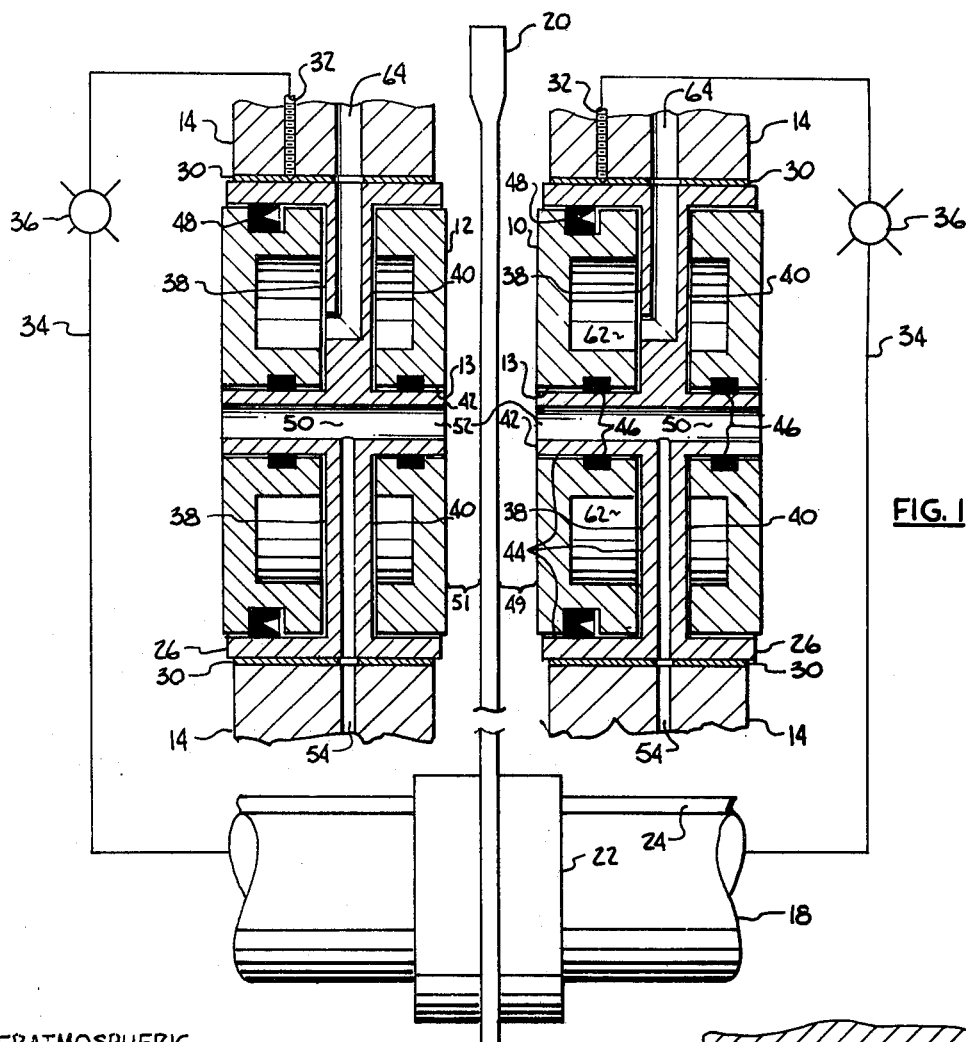
FIG. 1 is an extended, partially sectional end view of a rotary saw blade, with fluid bearing saw guides mounted on either side of the blade adaptable for guiding the blade by employment of the Bernoulli effect.

The saw guide of the present invention comprises a pair of flat-faced discs 10 and 12, each having an aperture 13 formed in its center, mounted in opposed spaced relation to one another in respective guide mounting arms 14. In the rotary saw application depicted in FIG. 1, wherein a group of spaced rotary saw blades such as 20 are driven by an arbor shaft 18, the mounting arms 14 are normally suspended from a conventional spacer assembly (not shown) oriented parallel with the arbor shaft 18 in the area above the top of the saw blades 20. The distance between the arms 14 is adjustable to any desired width by selection of appropriate spacers separating the arms 14. In the preferred embodiment of FIG. 1 each of the saw blades 20 has a hub portion 22 keyed to the arbor shaft 18 by means of a spline 24 for imparting torque to the blades while permitting them to float freely in an axial direction on the arbor 18.

Each mounting arm 14 includes a socket assembly 26 tightly mounted therein, with a layer of electrical insulation 30 surrounding the socket assembly isolating it from the mounting arm. A threaded electrical coupling 32 penetrates the insulation layer 30 at one point to partially complete an electrical circuit 34 between each socket assembly 26 and the arbor shaft 18. The circuit is fully completed only if the saw blade 20 strikes one of the guide assemblies during operation, in which case the completed circuit 34 will generate a malfunction signal to actuate an audible or visual warning indicator such as light 36. The malfunction signal may also be used to stop the feed automatically.

Each socket assembly 26 has a pair of large grooves 38, 40 formed in its opposite sides, each groove defining a toroidal shaped socket surrounding a hub portion 42 of each socket assembly. The diameter of the discs 10 and 12, and the diameter of their respective apertures 13, are such as to permit the discs to fit loosely over the hub portion 42 and inside the respective grooves 38, 40, leaving a small clearance 44 between the corresponding portions of the discs and annular grooves. Despite its intentionally loose fit, however, each disc is retained firmly within the groove by provision of a tightly compressed grip seal 46 which frictionally engages the hub portion 42 of the socket assembly and prevents outward movement of the disc toward the saw blade. Disc 10 moreover is provided with an external resilient sealing ring 40 which engages the perimeter of the groove 38 for purposes to be described hereafter. As is apparent from FIG. 1, each socket assembly 26 is adapted to seat a respective one of each pair of guide discs employed to guide adjacent saw blades powered by a common saw arbor. Hereafter the discussion will be limited to the operation of only one pair of guides 10 and 12 with respect to their included saw blade 20, the guidance of all other saw blades being identical.

Figure 2:
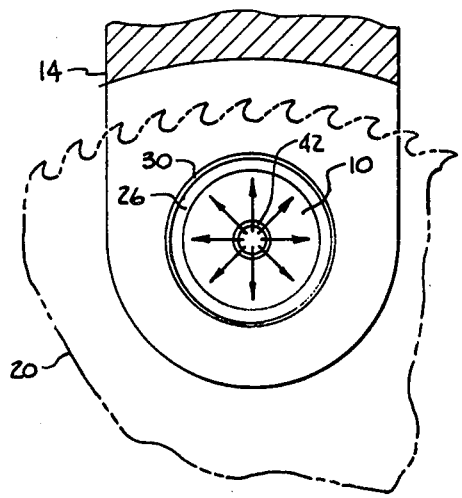
FIG. 2 is a reduced side view of one of the saw guides showing its relationship to a rotary saw blade.

Formed within the hub portion 42 of each socket assembly 26 is a passageway 50 having a port 52 communicating with a respective gap 49, 51 between the saw blade 20 and one of the guides 10 and 12. Each passageway 50 is supplied with a pressurized fluid from a source (not shown) through a respective duct 54 formed in the mounting arm 14. The pressurized fluid may be either gaseous or liquid, but a mixture of air, atomized arbor oil for lubricating the saw blade and oleic acid for preventing pitch accumulation is preferred. The fluid is introduced into each duct 54 at 80 to 125 psi and flows through the respective passageway 50 and port 52 into the center of the gap formed between the blade 20 and the respective saw guide disc. From port 52 the fluid mixture flows radially outwardly through the respective gap 49, 51 toward the perimeter of the disc as depicted in FIG. 2, where it escapes from the system.

Figure 3:
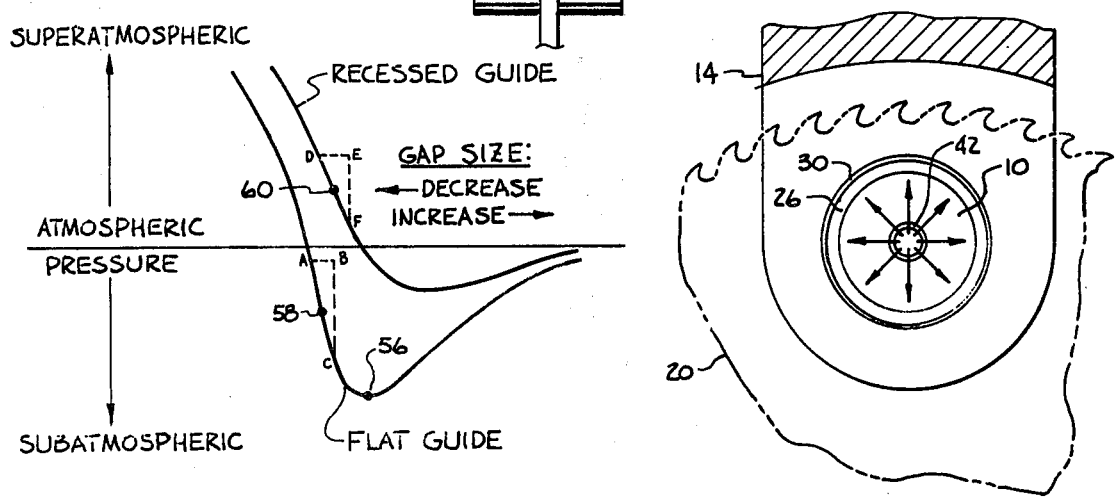
FIG. 3 is a characteristic graph, whose horizontal axis is on a logarithmic scale, illustrating the variation of integrated saw guidance pressure in response to changing gap size between saw guide and blade, for recessed and flat saw guides respectively.

The effect upon a particular side of the saw blade 20 of the pressurized fluid emitted from a respective port 52 depends upon the surface configuration of the respective discs 10 and 12 and the size of the gaps 49, 51. If the opposing faces of the two guide discs 10 and 12 are flat as illustrated in FIG. 1, the pressure on each side of the blade integrated over the area of the disc will vary with gap size as shown in the "flat guide" curve of FIG. 3. Starting with a large gap and gradually decreasing it, a gradually increasing suction effect will be experienced by the side of the blade 20. The explanation for this is that the gradually narrowing gap requires increasingly higher fluid velocities in the gap to permit the fluid to escape radially from the port 52, and these high fluid velocities cause a pressure drop throughout the gap pursuant to the well known Bernoulli principle. The suction continues to increase with decreasing gap until a maximum suction point 56 (FIG. 3) is reached. Thereafter further small decreases in gap tend rapidly to decrease the suction until eventually superatmospheric pressures are reached. From FIG. 3 it can easily be seen that the optimum region of the pressure variation curve for a flat saw guide is that portion bracketed by the triangle ABC. It is in this region that small changes in gap occasioned by small deflections of the saw blade cause the maximum change in suction on either side of the blade, and thereby cause the greatest rate of restoring force. If the gaps 49, 51 separating guide discs 10 and 12 respectively from the saw blade 20 are each initially set at a size corresponding to optimum point 58 on the pressure variation curve, then small deflections of the blade caused by knotholes or other external impediments will decrease the size of one of the gaps while correspondingly increasing the size of the other, thereby decreasing the suction in the narrower gap while increasing the suction in the wider gap. This imbalance in pressure caused by blade deflection will tend immediately to return the blade to the initial point of equilibrium corresponding to the point 58, where both suctions are equal. Because the rate of pressure imbalance due to small deflections of the blade is very high in the region surrounding optimum point 58, the restoring force will be rapidly reached and thus the resistance of the blade to deflections will be very high in this region.

The optimum initial gap setting for maximizing the rate of restoring force in the Bernoulli region will vary from case to case, depending upon such factors as the diameter of the guide disc employed and the pressure and physical nature of the fluid supplied through port 52. However for any particular case it is a relatively simple matter to construct an integrated pressure or force variation curve such as the "flat guide" curve shown in FIG. 3. For example the force on one side of the blade, and thus the integrated pressure across the area of the disc, can be obtained by means of a force transducer on the blade while one of the two guides is rendered inoperable. Alternatively, pressure readings within the gap can be obtained by drilling holes in the face of one of the guide discs, inserting small tubes into the holes from the back side of the disc so that the end of each tube is exposed to pressure in the gap, and connecting the other ends of the tubes to suitable pressure measuring devices such as manometers. Thereafter the integrated pressure in the gap can be plotted against changing gap size to obtain the desired force or integrated pressure variation curve, from which the optimum initial gap setting for operating in the Bernoulli region can be determined.

A guide disc having a recess formed in its face comparable to that shown in the aforementioned Fairfield, Jr. patent, but otherwise having the same diameter and employing the same fluid supply pressure as a flat guide, yields an integrated pressure variation curve (FIG. 3) having a configuration substantially different from that of the flat guide curve. Although the Bernoulli region is still encountered, no portion of the curve in the subatmospheric region exhibits a rate of change of integrated pressure on the blade comparable to that obtainable with a flat saw guide. Rather the greatest rate of pressure change responsive to blade deflection occurs in the superatmospheric region bracketed by triangle DEF. However the rate of change in pressure obtainable with a recessed guide operating in the superatmospheric region is only about one-half of that experienced with a flat guide operating in the Bernoulli region, other factors being equal. In addition, the optimum initial gap point 60 for the positive pressure system requires a gap size which is generally greater than that corresponding to optimum point 58 for the Bernoulli system. Accordingly, to obtain optimum restoring force, volumetric flow would generally be greater in the positive pressure system than in the Bernoulli system.

It is possible that the saw blade 20 will have certain minor curvatures or tapers in its surface or, because of deflections, will not present a continuous vertical plane surface to the saw guides. Inasmuch as it is desirable to maintain the flat faces of the guide discs in parallel relationship with the sides of the saw blade, it is advantageous to permit at least one and perhaps both of the guide discs to tilt slightly in response to such nonvertical surface configurations so as to maintain parallelism with the blade. In the embodiment of FIG. 1, guide disc 10 has this capability. While the grip provided by the seal 46 on the hub portion 42 of the socket assembly keeps the guide disc 10 from sliding in and out toward the saw blade so as to prevent any variation of the optimum initial gap size (except that caused by lateral deflections of the blade 20) the clearances 44 between the guide disc 10 and the socket assembly 26 permit the disc to tilt slightly in any direction about the seal 46. To enhance the responsiveness of the disc, an annular plenum chamber 62 is formed in the back of the guide disc 10 and exposed to a small positive pressure of approximately five to seven psi through passageway 64. The annular seal 48 on the exterior of the guide disc 10 prevents leakage of the pressure from the plenum chamber 62.

The terms and expressions which have been employed in the foregoing abstract and sepcification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A method of guiding a saw blade which comprises:
   a. exposing one side of said saw blade to a suction;
   b. exposing the opposite side of said saw blade to a suction equal in magnitude to said first suction;
   c. decreasing the suction on one side of said blade in response to the deflection of said blade toward said side, while simultaneously increasing the suction on the opposite side of said blade in response to said deflection; and
   d. utilizing the suction imbalance so created to restore said blade to its undeflected position.

2. The method of claim 1, further including mounting a pair of flat-faced saw guides in opposed relationship to one another on either side of said blade with the face of each guide substantially parallel with said blade and separated therefrom by a respective gap, and flowing a fluid through each of said gaps with sufficient velocity to create said suction pursuant to the Bernoulli effect.

3. The method of claim 2 wherein said fluid comprises air mixed with an atomized liquid lubricant.

4. The method of claim 3 wherein said fluid further includes a wood pitch solvent.

* * * * *

UNITED STATES PATENT AND TRADEMARK OFFICE
CERTIFICATE OF CORRECTION

PATENT NO. : 3,918,334
DATED : November 11, 1975
INVENTOR(S) : William H. Wilcox, deceased It is certified that error appears in the above-identified patent and that said Letters Patent are hereby corrected as shown below:

Col. 2, Line 17    Change "said" to --side--;

Col. 6, Line 29    Change "sepcification" to --specification--.

Signed and Sealed this thirtieth Day of March 1976

[SEAL]

Attest:

RUTH C. MASON
Attesting Officer

C. MARSHALL DANN
Commissioner of Patents and Trademarks